United States Patent [19]

Harrison et al.

[11] Patent Number: 5,553,243
[45] Date of Patent: Sep. 3, 1996

[54] METHOD AND APPARATUS FOR DETERMINING WITH HIGH RESOLUTION THE FIDELITY OF INFORMATION RECEIVED ON A COMMUNICATIONS CHANNEL

[75] Inventors: Stephen D. Harrison; George D. Rose, both of Lynchburg, Va.

[73] Assignee: Ericsson GE Mobile Communications Inc., Research Triangle Park, N.C.

[21] Appl. No.: 178,547

[22] Filed: Jan. 7, 1994

[51] Int. Cl.$^6$ ..................................................... H04Q 7/28
[52] U.S. Cl. .......................... 375/224; 375/347; 455/33.2; 455/179.1
[58] Field of Search .................................. 375/224, 347; 455/33.1, 33.2, 62, 67.3, 77, 161.3, 179.1; 379/59, 60; 370/17

[56] References Cited

U.S. PATENT DOCUMENTS

| | | | |
|---|---|---|---|
| 4,730,313 | 3/1988 | Stepheson et al. | 370/110.1 |
| 4,833,701 | 5/1989 | Comroe et al. . | |
| 4,833,702 | 5/1989 | Shitara et al. . | |
| 4,905,301 | 2/1990 | Krolopp et al. . | |
| 4,972,460 | 11/1990 | Sasuta . | |
| 4,989,204 | 1/1991 | Shimizu et al. . | |
| 5,093,926 | 3/1992 | Sasuta . | |
| 5,093,927 | 3/1992 | Shanley . | |
| 5,109,527 | 4/1992 | Akerberg . | |
| 5,111,535 | 5/1992 | Tokunaga | 455/33.2 |
| 5,125,103 | 6/1992 | Grube et al. . | |
| 5,128,938 | 7/1992 | Borras . | |
| 5,150,362 | 9/1992 | Akerberg . | |
| 5,212,805 | 5/1993 | Comroe et al. . | |
| 5,260,943 | 11/1993 | Comroe et al. | 455/33.2 |
| 5,280,637 | 1/1994 | Larosa et al. | 375/347 X |

*Primary Examiner*—Stephen Chin
*Assistant Examiner*—Kevin Kim
*Attorney, Agent, or Firm*—Nixon & Vanderhye P.C.

[57] ABSTRACT

A method and apparatus for determining with high resolution the fidelity of communications over a communications channel is disclosed. Portable/mobile radios freely roaming between multiple trunked RF communications sites calculate the fidelity of communications received over current and alternate channels with comprehensive, high bit error resolution using a weighted average error dispersion procedure. The weighted average error dispersion analysis generates for each group of redundant messages (and in some instances subpreamble bits) received by a roaming radio in each message frame a weighted average error dispersion number whose incrementally increasing magnitude reflects deteriorating signal fidelity. Decisions about switching to alternate communications channels are made by the roaming radio based on the incrementally changing weighted error dispersion number so that communication channels may be selected to achieve optimum signal fidelity and continuity of communication.

37 Claims, 6 Drawing Sheets

METHOD AND APPARATUS FOR DETERMINING WITH HIGH RESOLUTION THE FIDELITY OF INFORMATION RECEIVED ON A COMMUNICATIONS CHANNEL

FIELD OF THE INVENTION

This invention relates to digital communications, and more particularly, to a method and apparatus for determining the fidelity of information received on a communications channel. The present invention is particularly well suited for trunked (RF) communications systems where mobile radios roam between trunked (RF) communication sites and select a particular site based on a high resolution fidelity determination of an RF communication channel associated with each site.

BACKGROUND AND SUMMARY OF THE INVENTION

Trunked RF repeater systems and digital trunked radio transceivers capable of handling communications between numerous mobile units and dispatcher consoles in a single area are known. Trunked RF repeater systems are used, for example, by public service organizations (e.g., governmental entities such as counties, fire departments, police departments, etc.). Such RF repeater systems permit a relatively limited number of RF communications channels to be shared by a large number of users—while providing relative privacy to any particular RF communication (conversation). Typical state-of-the-art RF repeater systems are "digitally trunked" and use digital signals conveyed over the RF channels (in conjunction with digital control elements connected in the system) to accomplish "trunking" (time-sharing) of the limited number of RF channels among a large number of users.

Briefly, each digitally trunked RF communication site is assigned a "control" RF channel and multiple "working" RF channels. The working channels carry actual communications traffic (e.g., analog FM, digitized voice, digital data, etc.). The control channel carries digital control signals between the repeater sites and user RF transceivers (radio) in the field. When a user's transceiver is not actively engaged in a conversation, it monitors the control channel for "outbound" digital control messages directed to it. User depression of a push-to-talk (PTT) switch results in a digital channel request message requesting a working channel (and specifying one or a group of callees) to be transmitted "inbound" over the RF control channel to the repeater site. The repeater site (and associated trunking system) receives and processes the channel request message.

Assuming a working channel is available, the site generates and transmits a responsive "outbound" channel assignment digital message over the RF control channel. This message temporarily assigns the available working channel for use by the requesting transceiver and other callee transceivers specified by the channel request message. The channel assignment message automatically directs the requesting (calling) transceiver and callee transceivers to the available RF working channel for a communications exchange.

When the communication terminates, the transceivers "release" the temporarily assigned working channel and return to monitoring the RF control channel. The working channel is thus available for reassignment to the same or different user transceivers via further messages conveyed over the RF control channel. An exemplary single site trunked RF repeater system is disclosed in commonly-assigned U.S. Pat. Nos. 4,905,302 and 4,903,321 which are incorporated here by reference.

Single site trunked RF repeater systems may have an effective coverage area of tens of square miles. It is possible to provide one or more satellite receiving stations (and a single high power transmitting site) if a somewhat larger coverage area is desired. However, some governmental entities and other public service trunking system users may require an RF communications coverage area of hundreds of square miles. In order to provide such very large coverage areas, it is necessary to provide multiple RF repeater sites and to automatically coordinate all sites so that a radio transceiver located anywhere in the system coverage area may efficiently communicate in a trunked manner with other radio transceivers located anywhere in the system coverage area.

Figure 1:
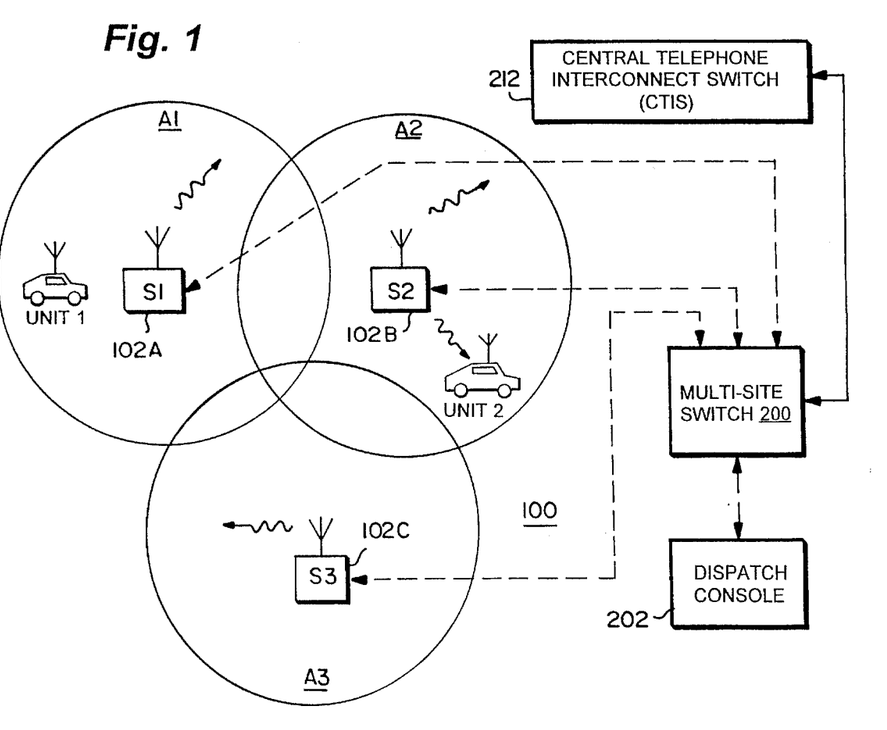
FIG. 1 is a schematic illustration of an exemplary multisite trunked RF communications system.

FIG. 1 is a schematic diagram of a simplified exemplary multiple-site trunked radio repeater system having three radio repeater (transmitting/receiving) sites S1, S2, and S3 providing RF communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. Each repeater site S1, S2, S3 includes a set of repeating transceivers operating on a control channel and plural RF working channels. Each site typically includes a site controller (e.g., a digital computer) that acts as a central point for communications in the site, and is capable of functioning relatively autonomously if all participants of a call are located within its associated coverage area.

To enable communications from one area to another, a switching network, hereafter sometimes referred to as a "multisite switch", may be provided to establish audio and control signal pathways between repeaters of different sites. These pathways are set up at the beginning of each call and taken down at the end of each call. For example, the site controller (S1) receives a call from a mobile radio in area A1 requesting a channel to communicate with a specific callee. A caller requests a channel simply by pressing the push-to-talk (PTT) button on his microphone. This informs the site controller S1 via an "inbound" digital control message transmitted over the site's RF control channel that a working or audio channel is requested. The site controller assigns a channel to the call and instructs the caller's radio unit to switch from the site's control channel to the audio channel assigned to the call. However, this assigned working channel is applicable only within the area covered by that site.

In addition, the site controller sends the channel assignment to multisite switch (200) which assigns an internal audio time slot to the call. The multisite switch also sends a channel request over a control messaging bus to other site controllers having a designated callee within their site area. Audio signals are routed through the multisite switch such that audio pathways are created to serve one or more callees and one or more dispatcher consoles 202 involved in the communication. Upon receiving a channel request, these "secondary" site controllers (in the sense they did not originate the call) assign an RF working channel to the call. Each secondary working channel is operative only in the area covered by the secondary site controller. The secondary site controller(s) also sends the channel assignment back up to the multisite switch.

Thus, the caller communicates with a radio unit or group of radio units in another area via the multisite switch. The call is initially transmitted to the primary site controller, routed through an assigned audio slot in the switch, and retransmitted by the secondary sites on various assigned channels in those other areas. When the call ends, the primary site controller deactivates the assigned channel for that site and notifies multisite switch 200 that the call is terminated. The multisite switch propagates an end of call command ("channel drop") to all other site controllers. This releases all working channels assigned to the call and breaks the associated audio routing pathways.

Detailed description and operation of such a distributed multisite switch is set forth in commonly assigned U.S. Pat. No. 5,200,954 to Teel, Jr. et al which is also incorporated herein by reference.

Mobile radios often "roam" from one trunked RF communications site to another. As a radio roams, it may detect a deterioration in reception of the monitored control channel of its currently selected site. That deterioration may be measured using various techniques.

One technique measures received signal strength and is typically referred to as Received Signal Strength Indicator (RSSI). Although the RSSI adequately measures received signal strength, RSSI is not always a satisfactory measure of overall audio fidelity, i.e., the degree of exactness with which audio information is received by the radio which is based, of course, on the audio information that was transmitted. For example, a strong signal may nonetheless have low fidelity because of intermodulation products, co-channel interference, echoes, and other noise. Although it is certainly desirable for a roaming radio to switch from a currently selected site with weaker signal reception to an adjacent site with stronger signal reception, that switching decision should also take into account the fidelity of the communications channels of that adjacent site.

One way to address signal fidelity is with known coding techniques such as BCH and Hamming that detect and correct errors of one or more bits in a single data word and set a flag if excessive errors exist. Conventional CRC and bit counting techniques provide an indication of the receipt of a "good" or "not-good" message. One drawback of these approaches is that significant redundancy bits must be added to the transmitted bit stream to insure bit error detection/correction. These extra bits reduce the amount of actual message data that can be sent per frame. A reduction in data message throughput is obviously undesirable and unacceptable. In addition, other system constraints may prevent an increase in the data transmission baud rate to compensate for the reduced throughput. What is needed is an approach that takes advantage of existing redundancies in the data stream rather than adding new redundancies.

Another approach is to determine an overall message error rate (MER) of a communications channel which typically involves counting the number of detected or corrected bit errors. When the MER exceeds a certain threshold number, the radio initiates a scanning procedure to look for and lock onto other available control channels A drawback with the MER approach is that by the time the radio determines that the MER for the current channel exceeds a preset threshold, signal fidelity and strength have often significantly deteriorated and continue to deteriorate as the radio roams further away from the current site. In other words, when the threshold is exceeded, the current control channel signal strength is effectively "lost," and the radio is unable to communicate until another communications channel can be identified and engaged.

Furthermore, counting of the numbers of errors and comparing that count to a threshold is not a comprehensive and accurate approach to measuring signal fidelity. Consider for example the situation where three identically transmitted redundant messages A, B and C are received on a communications channel by a radio as follows:

| Message | Possible Inputs (T = True F = Flawed Bit) | | | |
| --- | --- | --- | --- | --- |
| A | T | T | T | F |
| B | T | T | F | F |
| C | T | F | F | F |

Exclusive ORing (i.e. comparing) these messages results in the following:

| XOR AB | 0 | 0 | 1 | 0 |
| --- | --- | --- | --- | --- |
| XOR BC | 0 | 1 | 0 | 0 |
| XOR AC | 0 | 1 | 1 | 0 |

Just counting the errors by summing the number of "1's" after message comparison oversimplifies the signal fidelity analysis. There is no differentiation between one and two erroneous bits, the latter two bit errors obviously being more significant. Nor is there differentiation between all three bits being true and all three bits being flawed or in error. In that latter situation, the indication of signal fidelity is entirely false. Consequently, simple summation of bit errors fails to account for either the type or the degree of errors. A more comprehensive and higher resolution indicator of signal fidelity is needed.

The present invention overcomes the above-described problems providing a method and apparatus for determining with high resolution the fidelity of a communications channel without modifying (i.e. adding more redundancy bits) to the channel data stream as transmitted. Mobile/portable radios freely roam between multiple trunked RF communication sites and calculate the fidelity of communications received over current and alternate channels with comprehensive, high bit error resolution using a weighted average error dispersion procedure. This procedure generates for each group of redundant messages (and in some instances for subpreamble bits) from a preexisting messaging protocol format in the data stream received by a roaming radio in each message frame a weighted average error dispersion number whose incrementally increasing magnitude reflects deteriorating fidelity. Decisions about switching to alternate communications channels are made by the roaming radio based on this incrementally changing, weighted error dispersion number so that communication channels may be selected to achieve optimum signal fidelity and continuity of communication. In addition, an operator may programmably set for the radio a variable switching delta between error dispersion numbers of alternative communication channels relative to the current error dispersion number to ensure improved signal characteristics and communication continuity before initiating a change in communications channel.

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout.

DETAILED DESCRIPTION OF THE DRAWINGS

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so as not to obscure the description of the present invention with unnecessary detail.

The preferred embodiment of the present invention is described in the context of trunked RF communications. However, those skilled in the art will recognize that the present invention may be readily applied to any communications system having alternative communications channels including all types of communications media, e.g., air, wire, optical link, etc.

An exemplary trunked radio repeater system 100 in accordance with the invention is generally depicted and was described above in conjunction with in FIG. 1. Although only multisite network 100 is shown for purposes of illustration, the present invention is also applicable to extended networks having two or more digital multisite switches which permit even greater coverage. In the preferred multisite system 100, for example, the site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller via an "inbound" digital control message transmitted over its assigned RF control channel that an audio working channel is needed. The site controller assigns a working channel to the call and instructs the caller's radio unit to switch from the control channel to the assigned working channel. This assigned working channel is thus ready to support communications within the area covered by the site.

In addition, the site controller sends a message indicating the working channel assignment to multisite switch 200. The switch, in turn, sends a channel request to all other site controllers and routes audio signals such that an audio signal pathway is created between the RF site repeater servicing the caller and the RF site repeater(s) servicing the callee(s). Additional audio signal pathways may also be established in similar fashion such that one or more dispatch consoles 202 and land-line subscribers (via CTIS 212) may become involved in the communication. Upon receiving a channel request message, these "secondary" site controllers may each assign an RF working channel to the call (e.g., if a callee designated by the caller's channel request message happens to be physically located within the coverage area serviced by the associated RF transceiving site). Meanwhile, multisite switch 200 ensures that the caller's audio has been routed from the active RF receiver of site. S1 to active transmitters of each of the other sites participating in the call. Further details are provided, for example, in the above-referenced U.S. Pat. No. 5,200,954 to Teel, Jr.

Figure 2:
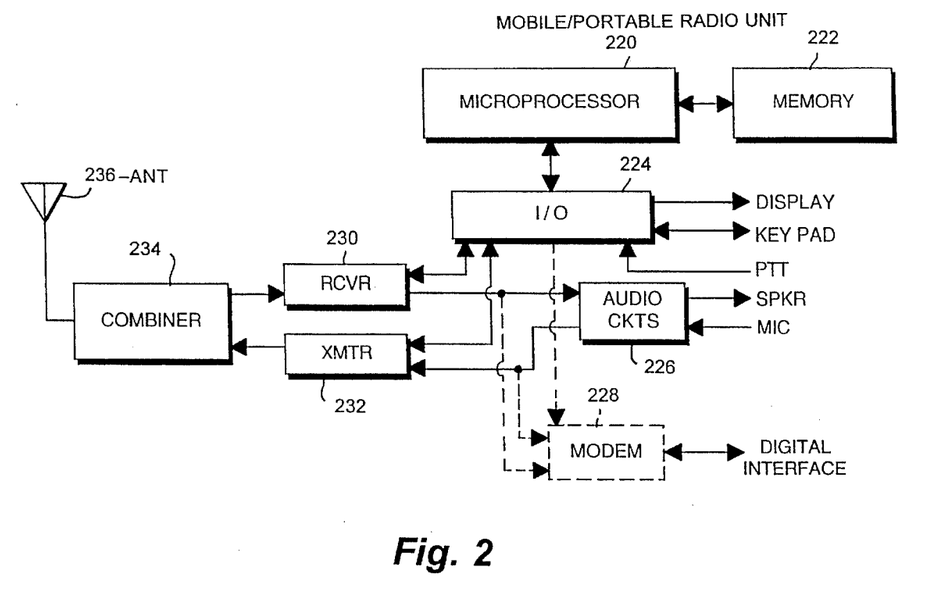
FIG. 2 is a block diagram of a mobile/portable radio transceiver unit that may be used to implement the present invention.

The general architecture of a suitable mobile/portable radio unit for use with the present invention is microprocessor based as depicted in FIG. 2. Here, microprocessor 220 is provided with suitable memory 222 and input/output circuits 224 so as to interface with the radio display, keypad, push to talk (PTT) switch as well as audio circuits 226 which provide basic analog audio outputs to the speaker and accept analog audio inputs from the microphone. Auxiliary control over a modem 228 as a digital interface (e.g., to voice encryption, vehicle location or other types of digital communication subsystems) may also be provided if desired. Of course, the I/O circuits 224 also permit suitable program control over RF receiver 230 and transmitter 232 which, via conventional signal combinet 234, permit duplex communication over a common antenna 236 as will be appreciated by those skilled in the art.

As described above, each mobile/portable radio unit is free to roam from the area covered by a currently selected site to adjacent areas which are controlled by adjacent sites. Each site has its own site identification number (ID), control channel frequency, group of working channel frequencies and similar information for sites all of which is maintained in the radio unit's memory 222. As the radio unit roams and selects a new site as its current site, the adjacent sites for the new site are identified to the radio unit via adjacent site control channel messages sent over the control channel of the newly selected site. In this way the radio unit maintains and updates a current adjacencies data base or list of the adjacent site IDs and these corresponding control channels.

A more detailed description of how this adjacency list is generated and updated for multiple sites in an extended wide area network including one or more multisite switch networks is described in commonly assigned, copending U.S. patent application Ser. No. 08/178,548, filed on Jan. 7, 1994 entitled "A Method And Apparatus For Permitting Radio Unit Roaming Between Trunked RF Transmission Sites Over A Wide Area That Encompasses Plural Multisite Networks," the disclosure of which is incorporated by reference.

Figure 3:
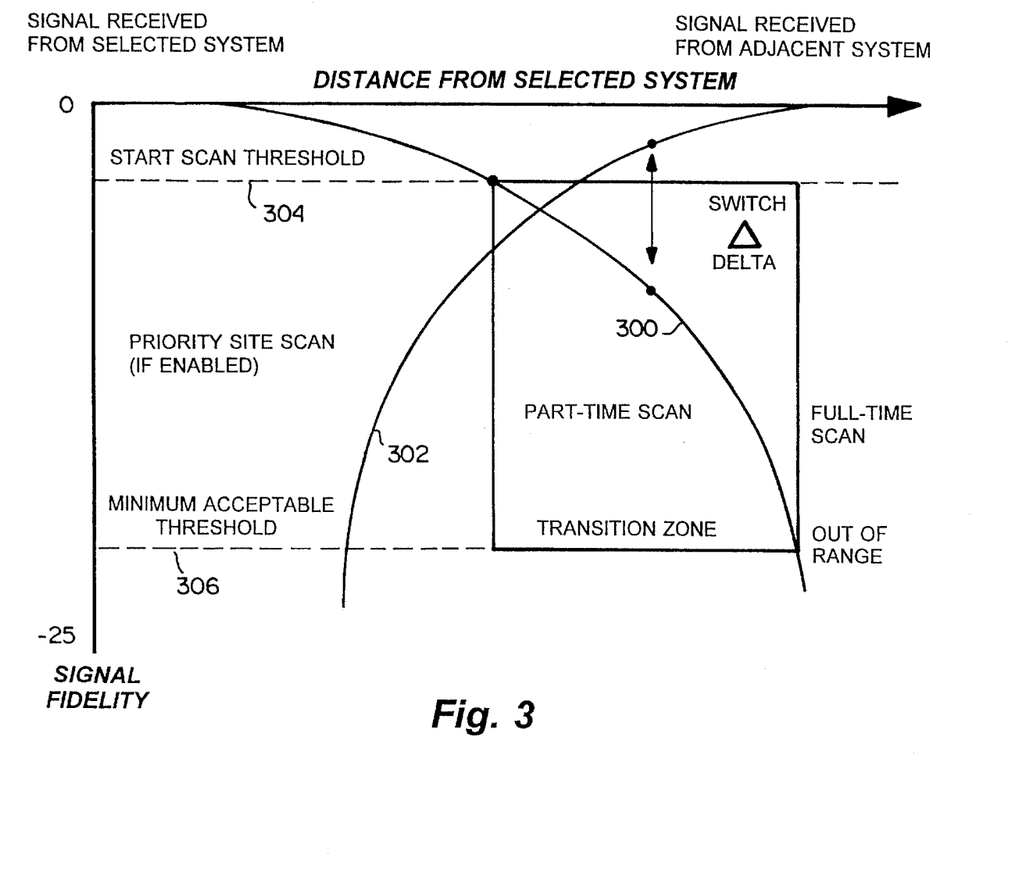
FIG. 3 is a graph showing the relationship between the distance from a radio unit and the selected and adjacent sites as a function of average bit error dispersion indicator.

Referring now to FIGS. 1 and 3, as a radio unit 1 moves away from the currently selected site S1 towards an adjacent site such as S2, the fidelity of signals received from site S1 gradually deteriorates as radio unit 1 moves further away (see curve 300 in FIG. 3). Conversely, as the radio unit 1 approaches adjacent site S2, curve 302 in FIG. 3 shows that the signal fidelity of transmissions received over a communications channel from that adjacent site steadily improve. As described above, signal fidelity is affected by a number of factors, and therefore, cannot be accurately measured using simplistic, low resolution techniques. FIG. 3 illustrates that indeed a high resolution indicator of signal fidelity for current and adjacent site communication channel transmissions which incrementally changes as the radio unit roams is required. For example, as soon as signal fidelity curve 300 for the currently selected site deteriorates to a specific start scan threshold 304, the present invention enables a part time scanning operation for determining the signal fidelity of communications received on control channels for adjacent sites. This part time scanning operation often coincides with the situation where the radio roams into a transition region where site area 1 and site area 2 overlap. In transition, there is a point at which the radio unit should switch communications from the current site to the adjacent site because the signal fidelity of curve 302 exceeds that of curve 300.

A switching delta Δ may be employed to ensure that the switch from the current site to the adjacent site is performed when it has been determined that the signal fidelity of the adjacent site is considerably better than that of the current site. Once the signal fidelity of received signals for the current site reaches a minimum acceptable threshold 306, full time scanning for a more acceptable control channel is initiated. If the signal fidelity for the current control channel is less than the start scan threshold 304 and the radio is not programmed to scan for a priority site, no scanning operation may be performed. Alternatively, the radio may be programmed to scan for a priority site if the current site is identified as a nonpriority site.

Figure 4:
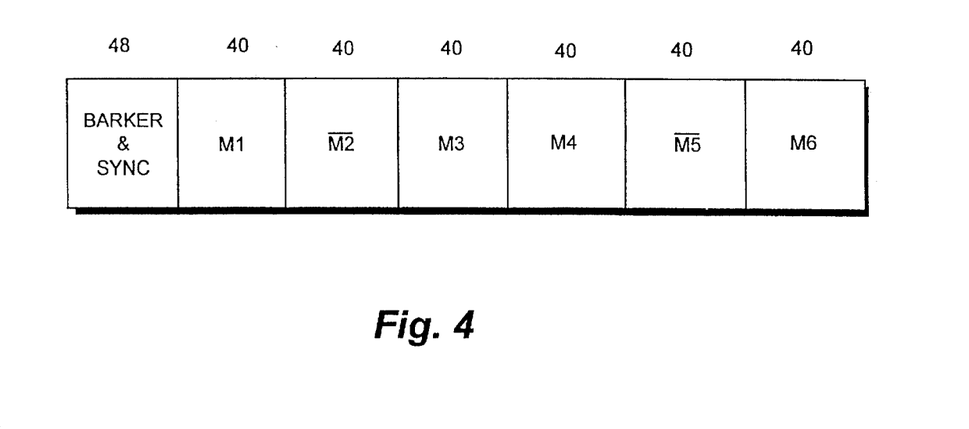
FIG. 4 is a general control channel message format transmitted by the site and received by the radio unit.

FIG. 4 shows an exemplary signalling protocol format for a single frame of information transmitted from the site over its control channel to radios tuned to the site's control channel that includes redundant messages within a message frame. The initial portion of bits in the frame include the conventional Barker and sync (for frame and bit synchronization) bits with the remaining portions of bits used for message information. In the preferred embodiment, forty-eight bits are allocated for the Barker and sync bits. Two messages may be transmitted per frame in the control channel. The first message of forty bits is repeated as three consecutive redundant messages M1, M2, and M3. Redundant message M2 is transmitted in complemented form for error checking purposes. The second forty bit message included in the control channel frame is likewise repeated three times at M4, M5, and M6. Like M2, the second repetition of the second message M5 is complemented for error checking purposes. Although the redundant messages within each frame are transmitted identically, the messages in successive frames will not necessarily be identical.

Figure 5A:
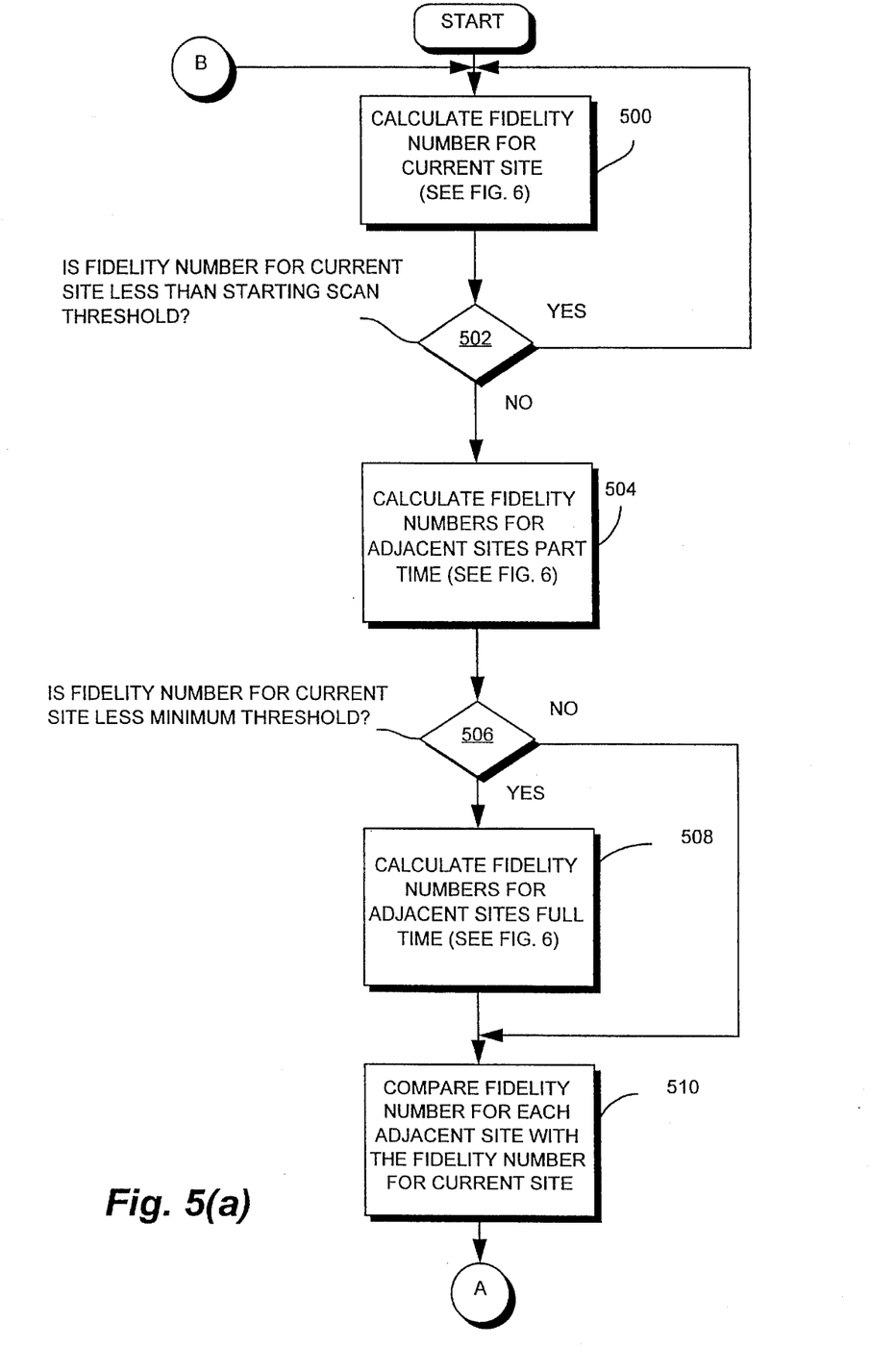
FIGS. 5(a), 5(b), 6, and 7 are detailed flow charts describing the procedures for determining the fidelity of control channel communications for current and adjacent RF repeater sites to permit a roaming radio to select the optimum site for conducting communications.
Figure 5B:
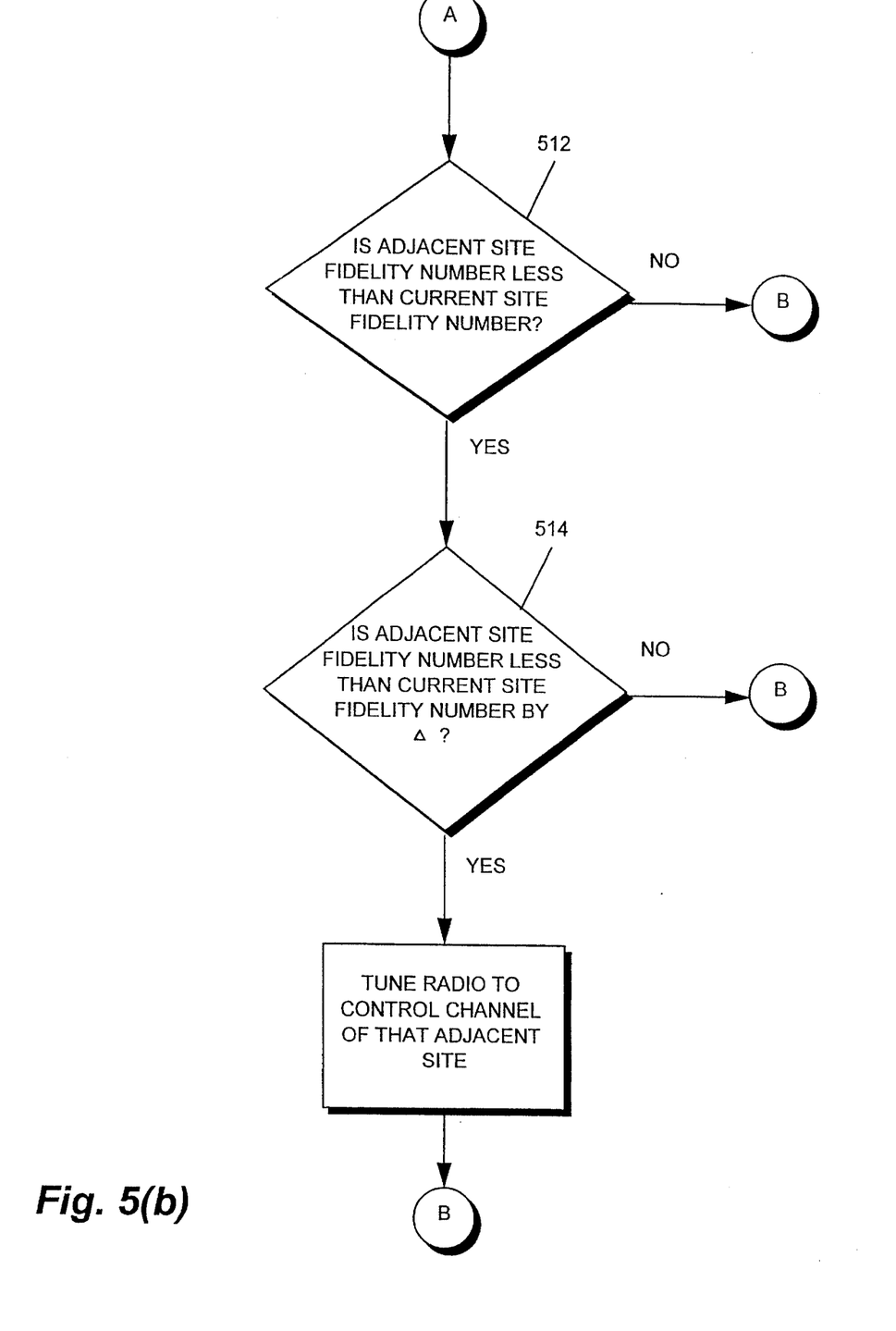

The procedure for determining the signal fidelity of communications received over a particular communications channel is now described in conjunction with FIGS. 5(*a*), 5(*b*), 6, and 7. The signal fidelity analysis in accordance with the present invention typically involves a weighted average error dispersion (WAED) determination performed on portions of bits received in each frame. With respect to the message portions of the frame, an odd number of received, redundant words or messages, e.g., three is used. The data bits in each redundant message is transmitted either identically or as an identical complement. WAED calculations may also be on the last 40 bits of frame subpreamble bits such as the Barker and sync sequence included in each exemplary frame in FIG. 4.

In general, the WAED calculation establishes a bit-wise majority logic word from a redundant message portion of the received message, and in the exemplary case, a first message in the frame is received as M1, M2, and M3. The bit-wise majority logic word may be viewed as a reference message. Subsequently, a weighted sum of each of the three messages and the bit wise majority logic reference message is individually calculated and labelled as one of four check words. The differences between each of the message check words and the reference check word represents the dispersion of bits. The greater the number of errors in the received messages, the greater the dispersion of bits with respect to the reference message. Of course, if all of the data words being evaluated are identical, the majority logic reference messages will also be identical, and there will be no dispersion of bits.

Summing the magnitude of the differences of the check words produces a signal fidelity indicator as a positive number whose increasing magnitude indicates deteriorating signal fidelity. In other words, if all the messages are identically received, the resulting fidelity indicator is zero. Since there may be some statistical variability between successive weighted average error dispersion calculations, integration or averaging of multiple WAED calculations (e.g. on the order of 20 calculations) may be performed in order to obtain a reliable signal fidelity indicator.

Assuming the exemplary format of FIG. 4 where there are two redundantly transmitted messages per frame (each repeated three times) along with at least 40 sync and Barker bits in the frame (hereafter subpreamble bits), one efficient way to quickly derive an additional WAED data point for each frame is to also calculate a WAED value for the subpreamble bits in each frame. Since the subpreamble bits are constant and known, each radio stores a previously determined weighted reference checkword for the last 40 bits of the subpreamble. Then a weighted version of the received 40 bits of the subpreamble is calculated. In the subpreamble message portion case, a bit-wise majority logic word for the received subpreamble message need not be calculated since the reference checkword for the transmitted preamble is already programmed into the radio. Then the weighted reference and received words are subtracted, and the difference is scaled, (e.g., multiplied by three), to the same level as the WAED calculations made for each repeated message, (e.g. repeated three times). The subpreamble and the two message WAED calculations for each frame may then be averaged in the calculation of a communications channel fidelity number.

The microprocessor 220 radio unit continuously performs a signal fidelity determination procedure as set forth in FIGS. 5(*a*)–5(*b*) which is stored either in on-chip microprocessor memory or in memory 222. The fidelity number (to be described in detail below in conjunction with FIGS. 6 and 7) for the communications received over the current site control channel is initially (and continuously) calculated (block 500). In decision block 502, a decision is made whether the fidelity number calculated for communications received over the control channel of the current site is less than a starting scan threshold. If it is, the radio continues to calculate and update the signal fidelity number for the current site (block 500). Although not shown in FIGS. 5(*a*)–5(*b*), as indicated with respect to the graph shown in FIG. 3, the radio may also at this point pursue signal fidelity calculations and comparisons of a priority site if a nonpriority site is currently selected.

Figure 6:
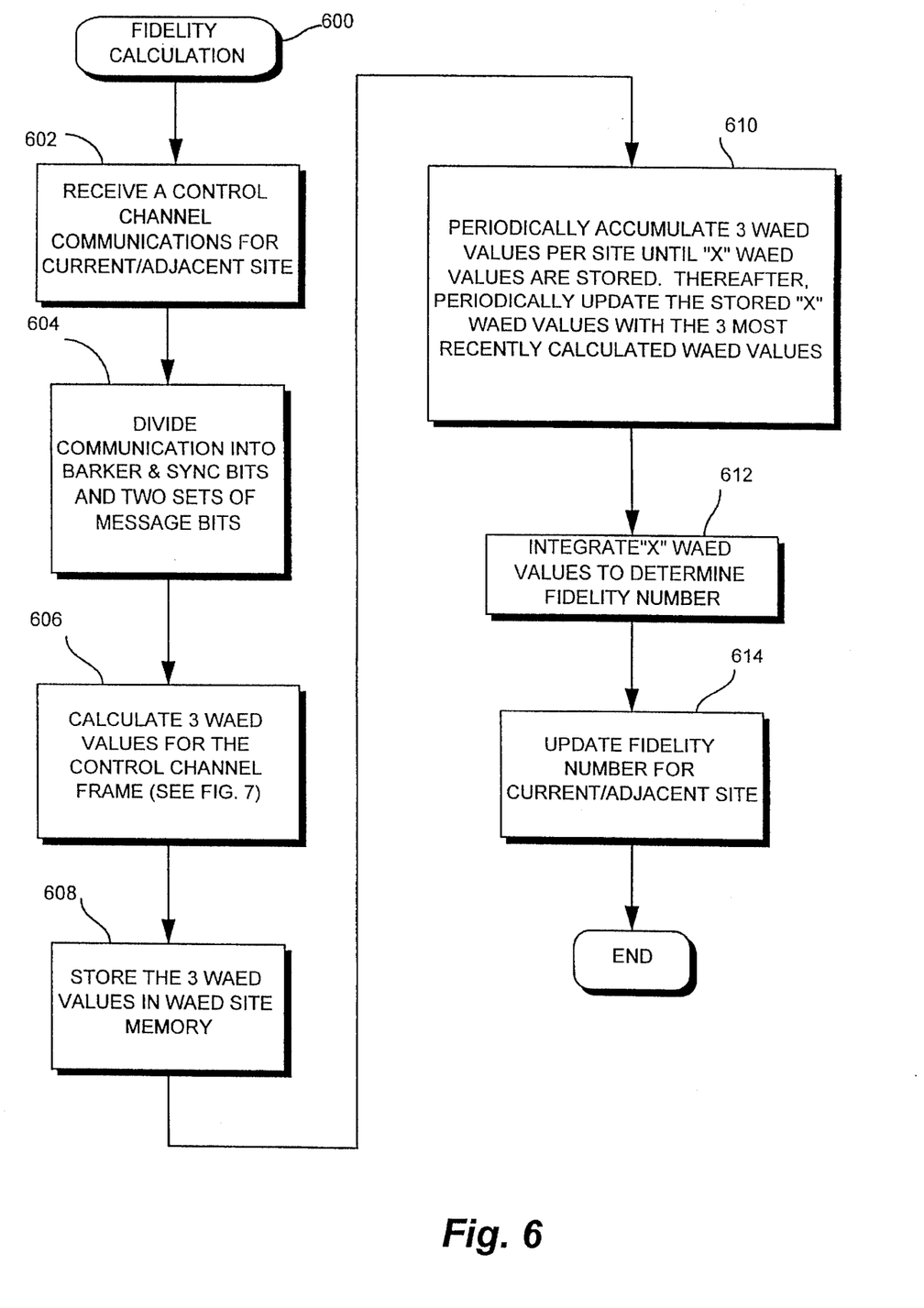

If the fidelity number calculated for the current site is greater than the starting scan threshold, control proceeds to block 504 where the radio microprocessor 220 calculates fidelity numbers for control channel communications received from adjacent sites on a part time basis in accordance with the algorithm described in FIG. 6. A determination is then made in block 506 whether the fidelity number calculated for the current site is less than a minimum threshold. If the current site fidelity number is less than a minimum threshold, control proceeds to block 508 where the radio microprocessor 220 calculates fidelity numbers for communications received on control channels corresponding to adjacent sites on a full time basis in accordance with the algorithms outlined in FIG. 6. Control then proceeds either from block 506 or block 508 to block 510 where the radio microprocessor 220 compares the fidelity number calculated for each adjacent site with the fidelity number for the current site. If the fidelity numbers of adjacent sites are greater than or equal to the current site fidelity number, control proceds (via flag B) back to block 500 to continue the calculation of fidelity numbers for the current and adjacent sites.

If an adjacent site fidelity number is less than the current site fidelity number, a determination is made in decision block 514 whether the adjacent site fidelity number is less than that for the current site by a preset amount delta Δ. As described earlier, this delta Δ is an optional feature but is advantageous in the sense that it provides a deadband feature to prohibit unnecessary multiple switching between current and adjacent sites until a switching operation is more than marginally advantageous in terms of improved signal fidelity. For this reason, if the different in fidelity numbers for the adjacent and current site do not exceed the preset Δ amount, control returns to block 500 where the fidelity number calculations for current and adjacent sites continue. Otherwise control proceeds to block 516 where the radio microprocessor 220 commands the radio receiver 230 to tune to the higher fidelity signal communications provided on the control channel of the adjacent site. Thereafter, the above-described procedure repeats starting from decision block 500.

The fidelity number calculation referred to in blocks 504 and 508 will now be described in more detail in conjunction with FIGS. 6 and 7. Beginning in FIG. 6, a fidelity calculation routine 600 is now described. The radio microprocessor 200 commands the receiver 210 to tune to the frequency of the control channel for either a current or an adjacent site in block 602 so the fidelity of signals received on that control channel may be determined. As described above, the microprocessor 220 maintains a data base or list in memory 222 of the current and adjacent site identification numbers along with their control channel numbers. In step 604, the microprocessor 220 breaks down the control channel communications from the site into frames as is well known and conventional in the art and divides each frame into three portions: subpreamble Barker and sync bits, a first message, and a second message. Reference is made to the exemplary frame illustrated in FIG. 4.

A weighted average error dispersion (WAED) value is calculated for the received Barker and sync bits and each of the two received messages to generate three WAED values for the analyzed control channel frame. These three calculated WAED values are stored in a portion of memory 222 allocated for WAED calculations for that particular site (block 606). Control proceeds to block 610 where sets of three WAED values are periodically calculated and stored for the control channel for that particular site until a predetermined averaging number X of WAED values is accumulated. Thereafter, each new set of three WAED values replaces the oldest set of three WAED values out of the total X values. While the "X" values could be initially accumulated continuously by the radio, the preferred embodiment accumulates (and thereafter updates) WAED values for the current and adjacent sites on a periodic, background processing task basis. This minimizes the amount of time the radio is not monitoring the control channel of the current site for any period of time.

The number X should be large enough in order to ensure a reasonable averaging of the WAED values over time and in the preferred embodiment may be on the order of 20. Once X WAED values are stored for the site, control proceeds to block 612 where the X number of WAED values for that site are integrated to determine a fidelity number (block 612). That fidelity number is then used to update an earlier calculated fidelity number for that same site stored in radio memory 222 (block 614).

Figure 7:
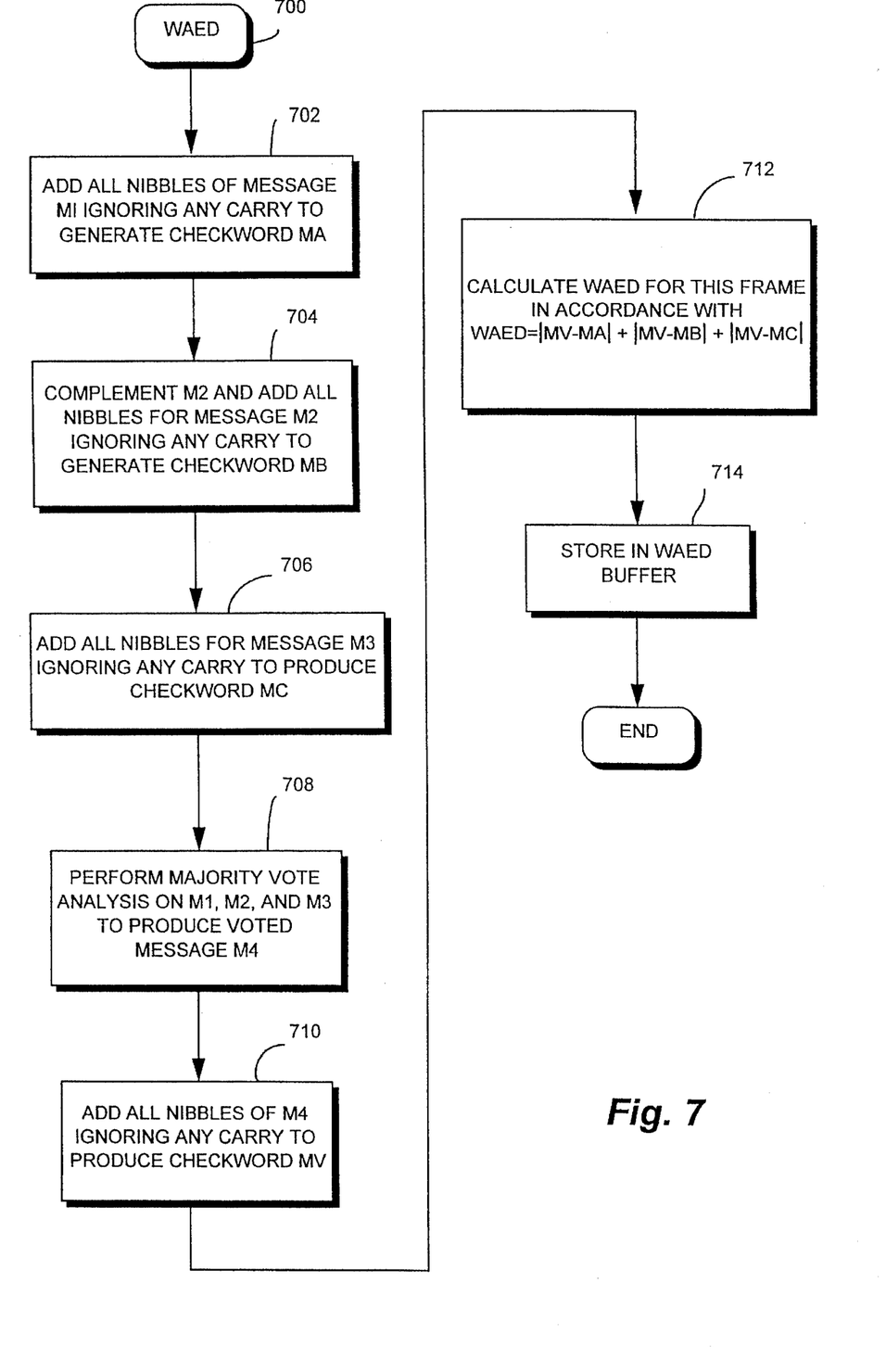

The weighted average error dispersion algorithm 700 referred to in FIG. 6 is described in conjunction with FIG. 7. The flow chart in FIG. 7 is described only in conjunction with the first message in a control channel frame involving redundant messages M1, M2, and M3. The same procedure is also applied to the second three times repeated message M4, M5, M6 and a slightly modified version of the procedure is applied to the subpreamble Barker and sync bits to obtain three WAED values per frame.

The first steps 702, 704, and 706 are directed towards calculating a weighted check word for each message M1, M2, and M3. The weighting process involves breaking each message into sections, e.g. 4-bit nibbles, having a preset number of bits and then determining the weighted value, i.e., 0–F hexadecimal, for each section of bits. For example, a 40-bit message will have ten 4-bit nibbles.

For example, four bit nibble 1010 is "weighted" in the sense that a binary "1" in the least significant bit represents decimal 1, the second least significant bit represents decimal 2, the third least significant bit represents decimal 4, and the most significant bit of the nibble represents decimal 8. Thus, a binary "1" in the most significant position is weighted eight times heavier than a "1" in the least significant bit position. The sum of these weighted bits is simply the hex value for that nibble. Thus, the four bit nibble 1010 is assigned a weighted value of "A" hex or 10 decimal. The ten weighted text numbers in each redundant message M1–M3 are summed for each message to form corresponding weighted check words MA, MB, and MC.

While the WAED analysis is described breaking down a forty bit message into four bit weighting length nibbles, those skilled in the art will appreciate that other weighting lengths from two bits to greater than six bits could also be used. However, weighting lengths greater than six bits may cause the most significant bits to have a distorted contribution while the least significant bits will have so little effect as to be negligible on the calculation outcome.

In step 708, a majority vote analysis is performed on the three messages M1, M2, and M3 to produce a voted message M4. Specifically, the three corresponding bits of each message are analyzed such that if two or three of those bits are both zero or both one, the corresponding bit in the voted message M4 is also that majority bit. The same weighting and summation process described for M1–M3 is also performed on all of the nibbles of voted message M4 (block 710). The majority voted weighted message MV provides a median value check word against which the three message check words MA–MC may be measured to determine the dispersion of the individual check word values. However and as described earlier, for the subpreamble bits, a reference checkword is already known and stored in the radio.

In block 712, the weighted average error dispersion for the message sent in the first half of the control channel frame is determined in accordance with the following equation:

$$WAED = |MV - MA| + |MV - MB| + |MV - MC|$$

The WAED value is then stored in memory 202 as indicated in block 714. If all four check words are equal, the resultant sum of the difference magnitudes of the average dispersions will be zero. However, the extent to which the four check words are different is reflected in the magnitude of the WAED sum. For the subpreamble bits, a difference between the prestored subpreamble reference checkword and the currently determined preamble checkword is determined and multiplied by three to generate a subpreamble WAED value. Thus, the WAED number is a single positive value whose magnitude increases incrementally from an optimum zero to a maximum value as bit error rate degrades.

As described in conjunction with FIG. 6, to effectively employ the WAED calculation, a multiple number of successively determined WAED numbers for a particular control channel should be averaged/integrated. Preferably the integration process is a rolling average continually updated with old readings being discarded. This mitigates the effects of factors such as Rayleigh fading and spurious signal readings as the radio roams.

The following is a simplified example of the WAED procedure where the example redundant message is 40 bits long with the eight bits shown repeated five times in the message.

| MESSAGE | BITS | CHECKWORD |
|---------|------|-----------|
| M1 | 1 0 1 0 1 0 1 0 . . . | 64H (100) |
| M2 | 1 1 0 0 1 1 0 0 . . . | 78H (120) |
| M3 | 1 1 1 1 0 0 0 0 . . . | 4BH (75) |
| MAJ | 1 1 1 0 1 0 0 0 . . . | 6EH (110) |

WAED = |MV − MA| + |MV − MB| + |MV − MC| = 0A + 0A + 23 = 37H (55)

In a best case scenario the WAED would be zero and in a worse case scenario, with the transmitted message being all zeroes and the received message being all ones, the WAED would be 160. Thus, the WAED calculation provides 160 incremental values over which the radio can determine with very high resolution the signal fidelity of communications received from a particular control channel.

While the invention has been described in connection with what is presently considered to be the most practical and preferred embodiment, it is to be understood that the invention is not to be limited to the disclosed embodiment. On the contrary, the invention is intended to cover various modifications and equivalent arrangements included within the spirit and scope of the appended claims.

What is claimed is:

1. A method for determining a weighted average error dispersion of data signals received over a current communication channel, comprising:

(a) detecting a frame of information on the current communications channel that includes plural redundant messages;

(b) determining a voted message from the redundant messages;

(c) splitting each redundant message and the voted message into multi-bit words and determining a weighted value for each word;

(d) summing the weighted values for each redundant message and the voted message to generate a corresponding checkword;

(e) determining a weighted average error dispersion for the received communications signal based on the sum of the differences between the voted message checkword and each redundant message checkword; and (f) searching for another communications channel if the weighted average error dispersion is outside of a desired range.

2. The method according to claim 1, wherein the number of bits in the multi-bit words is in the range of 2–6 bits.

3. The method according to claim 1, wherein the number of redundant messages is three.

4. The method according to claim 3, wherein one of the three messages is received in complemented form and the method further comprises complementing the received complemented message.

5. The method according to claim 1, wherein the weighted average error dispersion indicates the fidelity of the communication signals received over the communications channel such that as the weighted average error dispersion is incrementally increasing, the fidelity of the communication signals is incrementally decreasing.

6. The method according to claim 5, wherein the communications channel is a control channel of an RF transmitter being scanned by a mobile or portable radio transceiver.

7. The method according to claim 1, further comprising:

iteratively performing steps (a)–(f) a predetermined number of times;

integrating the weighted average error dispersion determined for each iteration; and generating a number which represents the fidelity of the communications channel based on the integration.

8. The method according to claim 1, further comprising:

changing to the another communications channel if the weighted average error dispersion for the another communications channel is less than the weighted average error dispersion for the current communications channel.

9. In a trunked RF communications system having plural RF repeater sites corresponding to geographical areas with each site having a corresponding RF communications channel that may be monitored by plural portable and/or mobile radio units roaming the sites area, each radio unit comprising:

a transceiver for selectively transceiving over multiple RF communications channels, and a processor for processing redundant messages included in a message frame received on an RF communications channel corresponding to a site selected by the radio unit to determine a reference message, combining the reference message and the redundant messages to determine a weighted error dispersion, and determining a fidelity value for the selected site communications channel based on the weighted error dispersion.

10. The system according to claim 9, wherein processor processes messages on RF communications channels corresponding to sites adjacent to the selected site to determine corresponding weighted error dispersions for those adjacent site communications channels and determines fidelity values for the adjacent site communications channels based on the corresponding weighted average error rates.

11. The system according to claim 10, wherein the processor further comprises:

means for comparing the adjacent site communications channel fidelity values with the selected site fidelity value, and means for commanding the transceiver to tune to the site communications channel having an optimum fidelity value.

12. The system according to claim 11, wherein the processor further includes means for determining whether a difference between an adjacent site fidelity value and the current site fidelity value exceeds a predetermined delta such that an adjacent site has an optimum fidelity value when the difference is equal to or exceeds the predetermined delta.

13. In a trunked RF communications system having plural RF repeater sites corresponding to geographical areas with each site having a corresponding RF communications channel that may be monitored by plural portable and/or mobile radio units roaming the sites areas, each radio unit comprising:

a transceiver for selectively transceiving on multiple RF communications channels;

a processor for processing messages received on an RF communications channel corresponding to a site selected by the radio unit to determine a weighted error dispersion using a reference message generated from the received messages, and determining a high resolution incremental fidelity indicator for the selected site communications channel based on the weighted error dispersion, wherein the fidelity indicator has a wide range of incremental values between desired fidelity and undesired fidelity.

14. The system according to claim 13, wherein processor includes:

means for detecting a frame of information on the selected site communications channel that includes plural redundant messages;

means for determining a voted message from the redundant messages;

means for splitting each redundant message and the voted message into multi-bit words and determining a weighted value for each word;

means for summing the weighted values for each redundant message and the voted message to generate a corresponding checkword;

means for determining the weighted error dispersion based on the sum of the differences between the voted message checkword and each redundant message checkword.

15. The system according to claim 14, further comprising:

means for searching for another communications channel if the weighted error dispersion is outside of a desired range.

16. The system according to claim 14, wherein the number of bit in the multi-bit words is in the range of 2–6 bits.

17. The system according to claim 14, wherein the number of redundant messages is three.

18. The system according to claim 17, wherein one of the three messages is received in complement form and the method further comprises complementing the received complemented message.

19. The system according to claim 14, wherein as the weighted error dispersion is incrementally increasing, the fidelity of the communication signals is incrementally decreasing.

20. The system according to claim 14, further comprising:

means for integrating the weighted error dispersion over a predetermined number of samples, wherein the fidelity indicator is based on the integration.

21. The system according to claim 13, wherein the means for processing messages includes:

means for detecting a frame of information on the selected site communications channel that includes a message word and a subpreamble word;

means for dividing the message and subpreamble words into multi-bit nibbles and determining a weighted value for each nibble;

means for summing the weighted values for each message and subpreamble word to generate a corresponding checkword;

means for comparing the corresponding checkwords to reference checkwords to determine error rate signals; and means for averaging the error rate signals for the received communications signal to determine the fidelity indicator.

22. In a trunked RF communications system having plural RF repeater sites corresponding to geographical areas with each site having a corresponding RF communications channel that may be monitored by plural portable or mobile radio units roaming the site areas, each radio unit comprising:

a transceiver for selectively transceiving over multiple RF communications channels, and electrical circuitry for processing sequential frames of message information received on an RF communications channel allocated to a site, each frame including at least a message content portion of bits and a control portion of bits, determining a reference signal for each frame from the received message information, weighting and summing bits in one of the message content and control portions to provide plural checkwords, comparing the plural checkwords with the reference signal to determine respective differences, and determining a fidelity value for a site communications channel based on the differences.

23. The system as in claim 22, wherein the weighted error calculation is performed on both the message content and control portions and wherein the fidelity value is based on an average of plural weighted error calculations for both the message content and control portions.

24. The system in claim 9, wherein the processor weighs each message based on bit values at various bit positions in the message.

25. The system in claim 9, wherein the processor determines a reference message using the plural messages, weights each of the plural messages and the reference message, and calculates the weighted average error rate using the weighted messages.

26. The system in claim 25, wherein the processor sums differences between the weighted reference message and each of the weighted plural messages to calculate the weighted average error rate.

27. The system in claim 13, wherein the processor determines a reference message from plural messages processed on the RF communications channel and uses the reference message along with the plural messages to determine the weighted average error dispersion.

28. The system in claim 27, wherein the processor further determines a weighted average error dispersion from the reference and plural messages and the means for determining determines the high resolution incremental fidelity indicator based on the weighted average error dispersion.

29. In an RF communications system having plural RF base stations corresponding to geographical areas with each base station having a corresponding RF communications channel monitored by plural portable and/or mobile radios roaming the corresponding areas, a method of operating a portable radio comprising the steps of:

processing digital messages currently received over an RF communications channel by one of the RF base stations, generating a reference signal representative of the received digital messages, determining a fidelity value for the selected base station communications channel based on a number of differing digital bits between the reference signal and the received digital messages.

30. The method in claim 29 wherein a communications frame over the communications channel includes redundant messages and the reference signal is generated based on the redundant messages.

31. The method in claim 30, wherein the reference message is determined by voting the redundant messages.

32. The method in claim 30, further comprising:
(a) weighting the redundant and reference messages, and
(b) differencing the weighted redundant and reference messages,
(c) summing differences generated in step (b),
(d) dividing a sum generated in step (c).

33. The system as in claim 23, wherein the control portion is a subpreamble containing timing information.

34. The system in claim 22, wherein performing the weighted error calculation further comprises combining bits in each of the message content and/or control portions of bits to be weighted such that bits in one bit position of the portion of bits to be weighted are weighted more heavily than bits in another bit position.

35. The system according to claim 9, wherein the reference message is determined by voting the redundant messages.

36. The system according to claim 13, wherein some of the received messages are redundant and the reference message is determined by majority voting the redundant messages.

37. The system in claim 22, wherein the received message information includes redundant messages and the reference signal is determined by majority voting the redundant messages.

* * * * *